(12) United States Patent
Freiling et al.

(10) Patent No.: US 7,354,084 B2
(45) Date of Patent: Apr. 8, 2008

(54) LIFTING DEVICE AND METHOD OF USE THEREOF

(76) Inventors: Perry Freiling, 2 Sunglow Road, Winnipeg, MB (CA) R3W 1A5; Don Freiling, 2 Sunglow Road, Winnipeg, MB (CA) R3W 1A5

( * ) Notice: Subject to any disclaimer, the term of this patent is extended or adjusted under 35 U.S.C. 154(b) by 0 days.

(21) Appl. No.: 11/551,591

(22) Filed: Oct. 20, 2006

(65) Prior Publication Data
US 2007/0057520 A1   Mar. 15, 2007

Related U.S. Application Data

(63) Continuation of application No. 10/820,779, filed on Apr. 9, 2004, now abandoned.

(60) Provisional application No. 60/466,780, filed on May 1, 2003.

(51) Int. Cl.
*B65G 7/12* (2006.01)
(52) U.S. Cl. .......................................... 294/15; 294/26
(58) Field of Classification Search .................. 294/15, 294/19.1, 26, 62, 89; 404/73, 99; 52/125.2–125.4, 52/749.11, 749.14
See application file for complete search history.

(56) References Cited

U.S. PATENT DOCUMENTS

| | | | | |
|---|---|---|---|---|
| 575,697 A * | 1/1897 | Buzzard | ...................... | 404/77 |
| 765,674 A * | 7/1904 | Normandin | ................... | 294/15 |
| 884,434 A * | 4/1908 | Wolgamott | ................. | 294/169 |
| 1,184,491 A * | 5/1916 | Ross | .......................... | 449/62 |
| 3,203,606 A * | 8/1965 | Masterson, Jr. | ............. | 294/137 |
| 3,559,371 A * | 2/1971 | Borrowman | ................. | 53/390 |
| 3,980,190 A * | 9/1976 | Paterson | ..................... | 414/456 |
| 4,149,743 A * | 4/1979 | Becnel | ......................... | 294/26 |
| 4,242,928 A * | 1/1981 | Haley et al. | .................. | 81/485 |
| 5,137,314 A * | 8/1992 | Gunter | ......................... | 294/15 |
| 5,740,586 A * | 4/1998 | Gomas | ......................... | 16/436 |
| 6,386,608 B1 * | 5/2002 | Eister | ........................... | 294/62 |

\* cited by examiner

*Primary Examiner*—Dean J Kramer
(74) *Attorney, Agent, or Firm*—Ryan W. Dupuis; Michael R. Williams; Adrian D. Battison

(57) ABSTRACT

A lifting device and method of use permit objects having a flat bottom supported on particulate material to be readily lifted. The device includes an elongate shaft member extending in a longitudinal direction between respective first and second ends. A hook member is supported on the first end of the shaft member to extend substantially straight along a hook axis lying substantially perpendicular to the longitudinal direction of the shaft member. A gripping member supported on the shaft member adjacent the second end permits gripping in a hand of a person. The substantially perpendicular configuration of the hook member readily permits rectangular objects to be well supported on the hook member for lifting heavy objects including pre-cast concrete sidewalk slabs and the like.

18 Claims, 7 Drawing Sheets

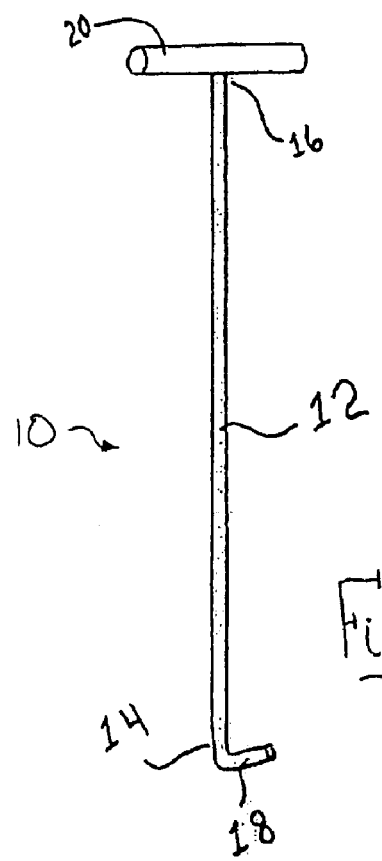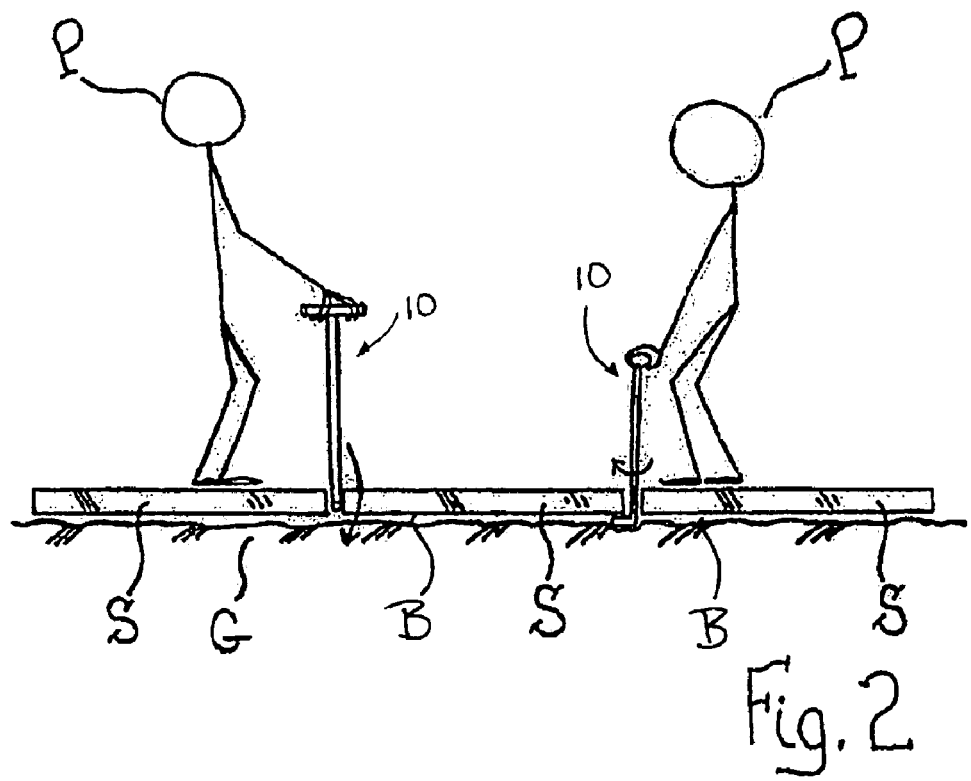

LIFTING DEVICE AND METHOD OF USE THEREOF

This application is a continuation of U.S. patent application Ser. No. 10/820,779, filed Apr. 9, 2004 now abandoned, and claims the benefit under 35 U.S.C. 119(e) of U.S. provisional application Ser. No. 60/466,780 filed May 1, 2003.

FIELD OF THE INVENTION

The present invention relates to a lifting device for lifting objects, and more particularly the invention relates to a kit of parts including plural lifting devices and a method of use thereof for extracting, lifting, re-positioning, or accurately repositioning various objects, for example pre-cast concrete members including sidewalk slabs and blocks, landscape ties, or other large/heavy items typically having a flat bottom supported on particulate material.

BACKGROUND

Various configurations of lifting devices are known in the prior art which include a handle and a hook member supported thereon for gripping an object. Known configurations of hook members are typically curved in profile or lie at an awkward angle in relation to a shaft of the lifting device such that it would be awkward or impossible to lift large heavy objects such as pre-cast concrete panels and blocks. Furthermore, known prior art designs of lifting devices generally do not permit the hook member thereof to be received within the narrow gap typically located between adjacent slabs in a sidewalk formed of pre-cast concrete slabs lying adjacent one another.

SUMMARY

According to a first aspect of the present invention there is provided a lifting device comprising:

an elongate shaft member extending in a longitudinal direction between respective first and second ends;

a hook member supported on the first end of the shaft member, the hook member being substantially straight along a hook axis lying substantially perpendicular to the longitudinal direction of the shaft member; and a gripping member supported on the shaft member adjacent the second end thereof for being gripped in a hand of a person.

The substantially perpendicular configuration of the hook member readily permits rectangular objects to be well supported on the hook member for lifting heavy objects including pre-cast concrete sidewalk slabs and the like.

According to a second aspect of the present invention there is provided a lifting kit for lifting objects having a flat bottom supported on particulate material, for example pre-cast concrete members and the like in which the kit comprises a plurality of lifting devices in accordance with the first aspect of the present invention.

According to a further aspect of the present invention there is provided a method of lifting an object having a flat bottom supported on particulate material on the ground, the method comprising:

providing at least one lifting device comprising an elongate shaft member; a hook member supported on a first end of the shaft member to extend substantially straight along a hook axis lying substantially perpendicular to a longitudinal direction of the shaft member; and a gripping member supported on the shaft member adjacent a second end thereof;

positioning the hook member of said at least one lifting device adjacent and parallel to a respective side edge of the object;

lowering the hook member of said at least one lifting device along the respective side edge below a respective bottom edge of the object;

rotating the hook member of said at least one lifting device about a longitudinal axis of the shaft member until the hook member is positioned below the object; and lifting said at least one lifting device.

The shaft member and the hook member may be integrally formed of a single rod of material which has been deformed and which is circular in cross section at the first end thereof.

The shaft member may be approximately two feet in length or any other suitable length, possibly in the range of 1.5 to 3 feet, to permit person to lift an object off the ground while in a comfortable standing position.

The shaft member and the hook member preferably have a similar cross sectional dimension which is substantially less than ½ inch.

The gripping member may comprise a handle mounted on the shaft member transversely to the longitudinal direction of the shaft member and the hook axis which is either injection molded in place onto the shaft or later secured to the shaft by welding or other suitable fastening means. In either instance, the handle preferably remains fixed in orientation relative to the shaft member and the hook member once mounted thereon.

The method may include providing a plurality of lifting devices and positioning the lifting devices along opposing side edges of the object.

When lifting an object comprising a first pre-cast concrete sidewalk slab, positioned adjacent a second sidewalk slab of similar configuration, the method preferably includes inserting the hook member of said at least one lifting device in a gap defined between the first and second sidewalk slabs.

BRIEF DESCRIPTION OF THE DRAWINGS

In the accompanying drawings, which illustrate exemplary embodiments of the present invention:

FIG. 1 is a perspective view of the lifting device.

FIG. 2 is a side elevational view of a pair of lifting devices being used to lift a pre-cast concrete slab in which only one of the lifting devices is engaged below the slab.

DETAILED DESCRIPTION

Figure 3:
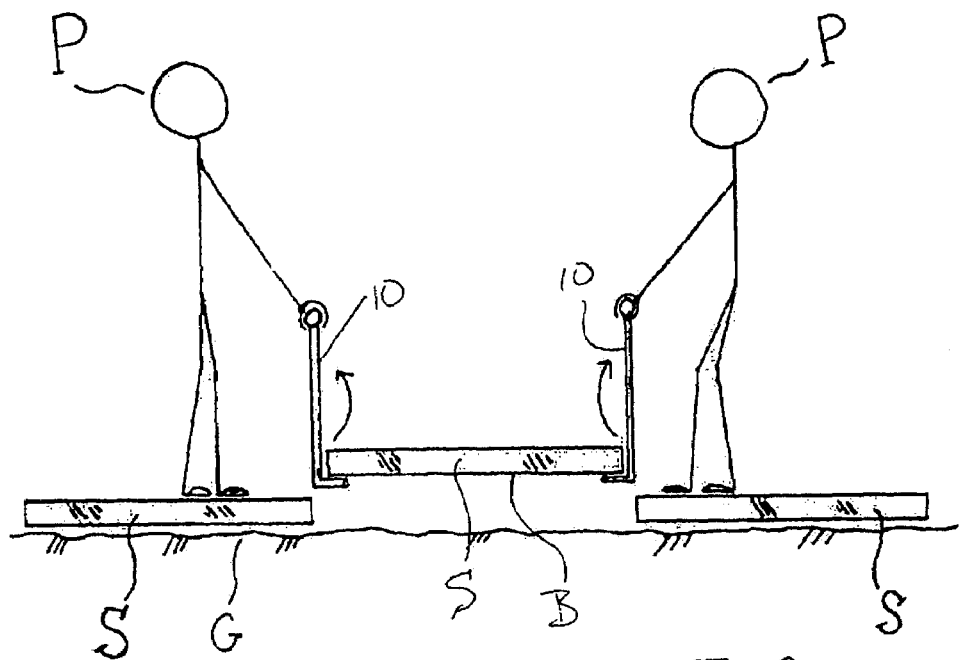
FIG. 3 is a side elevational view similar to that of FIG. 2 in which both lifting devices are engaged below the concrete slab.
Figure 4:
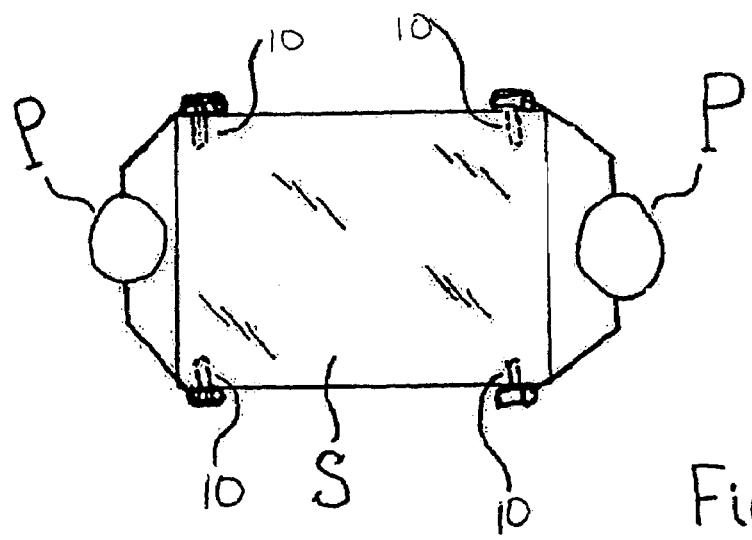
FIG. 4 is a top plan view in accordance with FIGS. 2 and 3.
Figure 5:
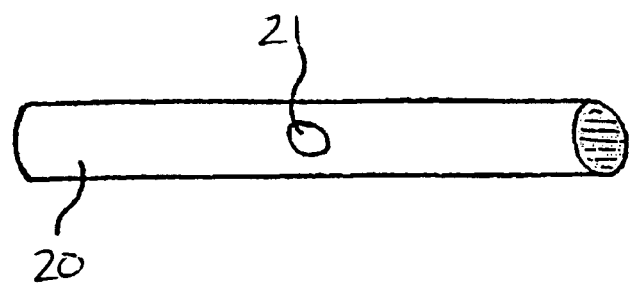
FIG. 5 is a top plan view of a first embodiment of the handle of the lifting device.
Figure 6:
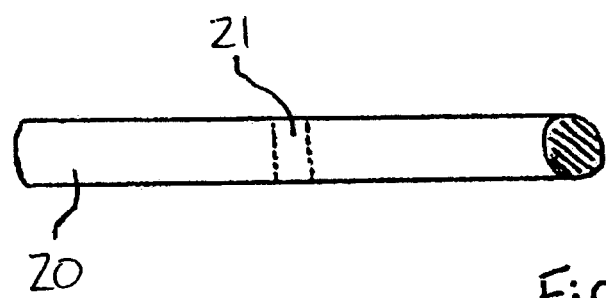
FIG. 6 is a side elevational view of the handle of FIG. 5.
Figure 7:
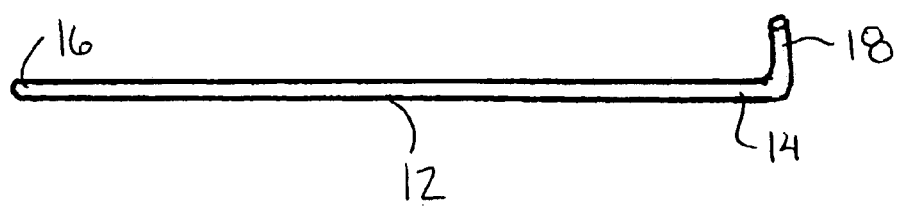
FIG. 7 is a side elevational view of the shaft and hook member of the lifting device for use with the handle of FIG. 5.
Figure 8:
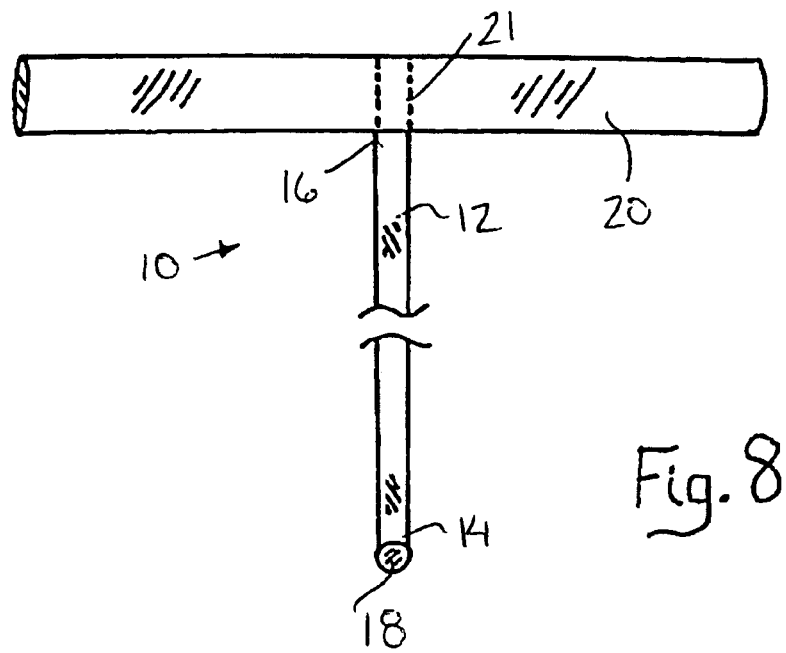
FIG. 8 is a front elevational view of the lifting device in accordance with FIG. 5 in an assembled position.

Referring to the accompanying drawings, there is illustrated a lifting device generally indicated by reference numeral 10. The device 10 is normally available as a kit of two or four lifting devices of similar configuration which are used by persons P for lifting pre-cast concrete members, for example sidewalk slabs S or blocks and any other large heavy object generally having a flat bottom surface B supported on particulate material on the ground G, for example crushed stone or the like.

While various embodiments of the device 10 are shown in the drawings, the common features will first be described herein. The device 10 generally includes an elongate shaft 12 which extends in a longitudinal direction between a first end 14 and a second end 16. A hook member 18 is mounted on the first end 14 of the shaft to lie substantially perpendicularly at a slight acute angle of approximately 87 degrees to the longitudinal direction of the shaft. The hook member extends straight along a respective hook axis which lies in the direction of the hook member generally perpendicularly to the longitudinal direction of the shaft. The hook member and the shaft are integrally formed of a single cold rolled steel rod which is 3/16 of an inch in diameter by bending the first end 14 of the shaft. The hook member 18 is approximately one inch in length while the shaft 12 is nearly two feet in length, By bending the angle to a few degrees less than 90 degrees between the hook member and the shaft, slight bending of the shaft toward an object to be lifted when weight is applied thereto is offset.

The second end 16 of the shaft mounts a handle 20 thereon. The handle 20 lies in common plane with the shaft member yet a longitudinal direction of the handle 20 is oriented perpendicularly to the hook axis. The handle 20 once attached to the shaft 12, is fixed in orientation relative to the shaft to control direction of the hook member 18 by rotating the handle 20 and the shaft fixed thereto.

In a first embodiment as shown in FIGS. 5 through 8, the handle generally comprises a cold rolled steel rod of half an inch in diameter and approximately five inches in length. A mounting hole 21 extends through the handle 20 at a central location perpendicular to a longitudinal direction of the handle. The mounting hole receives the second end of the shaft therein for mounting the handle 20 perpendicularly to the shaft 12 by a suitable welding operation. The ends of the handle are rounded and tapered to remove the sharp edges therefrom.

Figure 12:
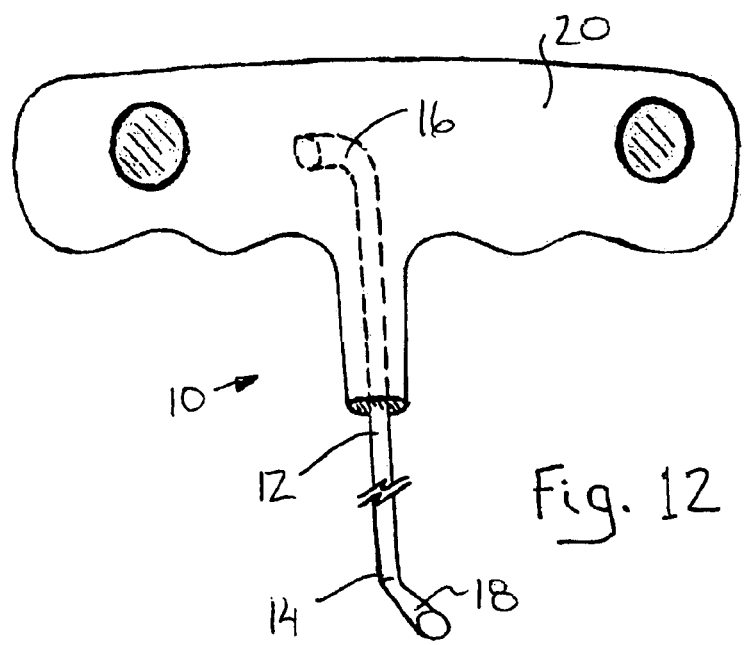
FIG. 12 is a perspective view of a second embodiment of the handle.

In a further embodiment of the handle 20 illustrated in FIG. 12, the second end 16 of the shaft member is deformed by bending and the handle 20 is injection molded of suitable high strength plastic material about the deformed second end 16 of the shaft member. The deformation of the shaft member at the second end assists in retaining the handle about the shaft member. Any type of deformation including bending, marring, texturing, or otherwise modifying the smooth cross-sectional shape of the shaft at the second end would be suitable to assist in retaining the injection moulded handle about the second end of the shaft.

Figure 9A:
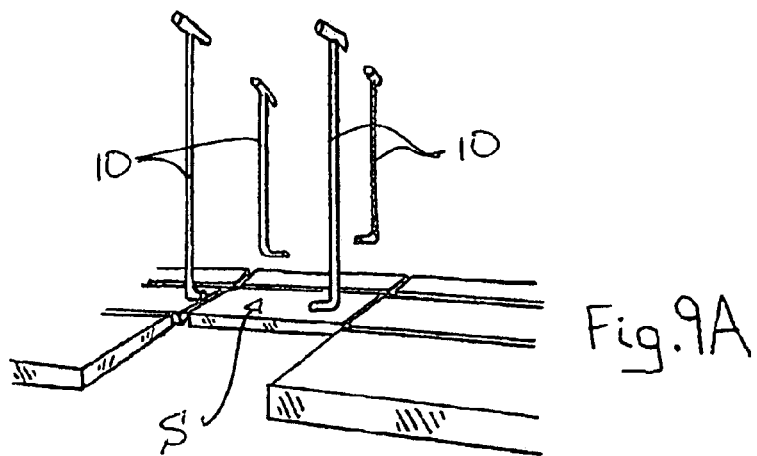
FIGS. 9A through 9C are perspective views of a plurality of lifting devices being inserted adjacent opposing side edges of a concrete slab to be lifted.
Figure 9B:
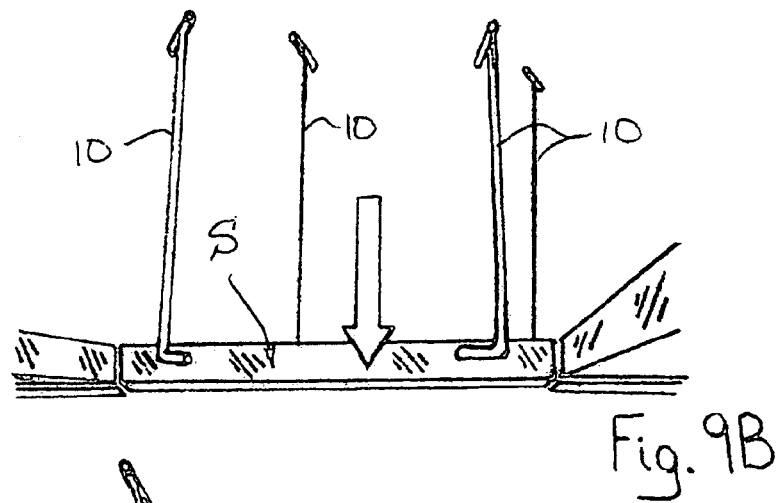
Figure 9C:
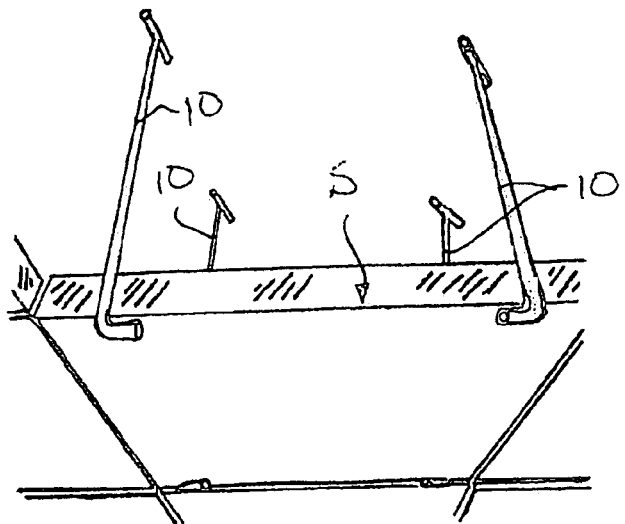
Figure 10A:
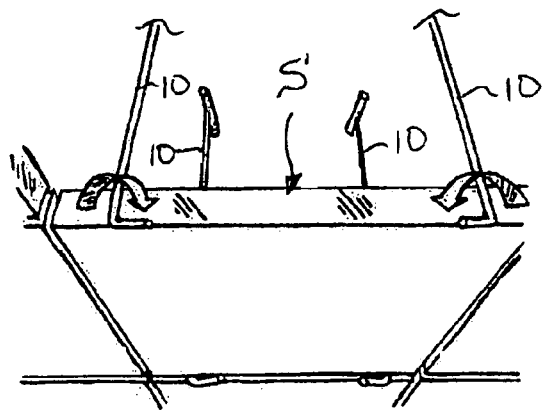
FIGS. 10A through 10C are perspective views of the lifting devices in accordance with FIGS. 9A through 9C as they are rotated to position the hook members below the concrete slab.
Figure 10B:
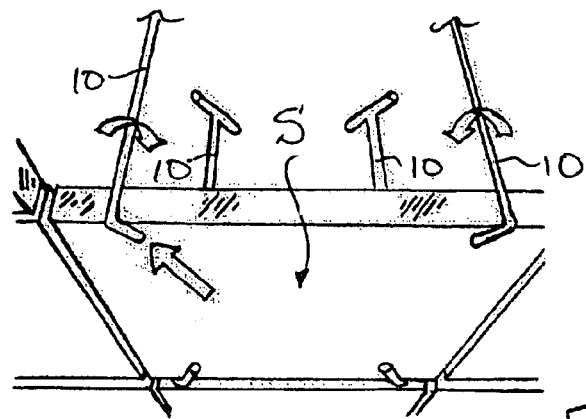
Figure 10C:
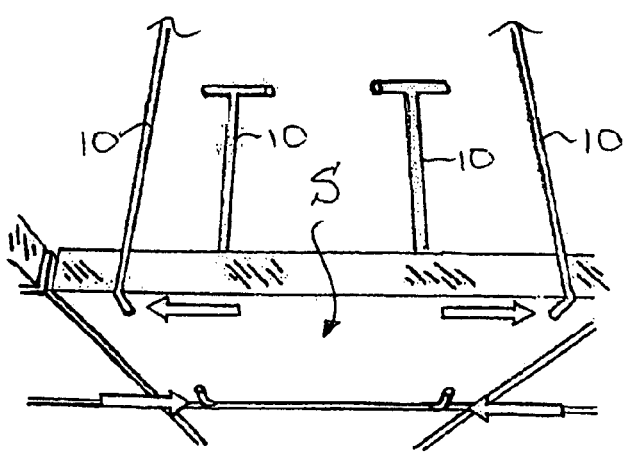
Figure 11A:
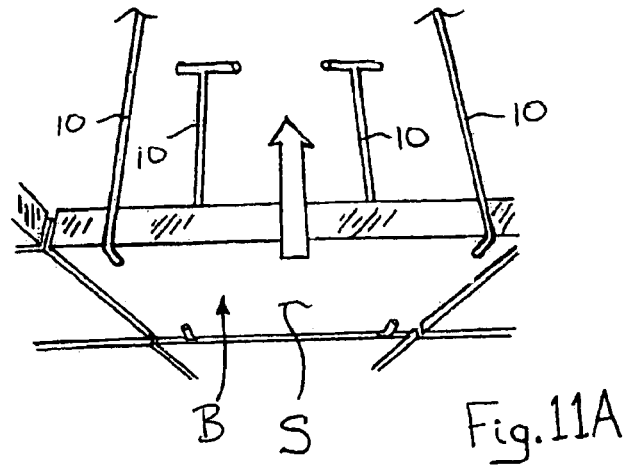
FIGS. 11A through 11C illustrate the various steps in lifting the concrete slab once the hook members are engaged below the slab.
Figure 11B:
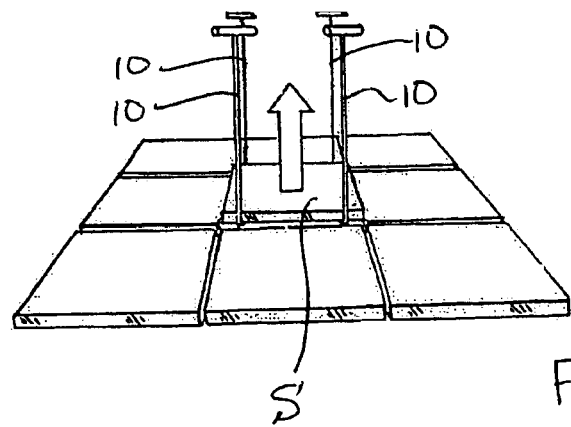
Figure 11C:
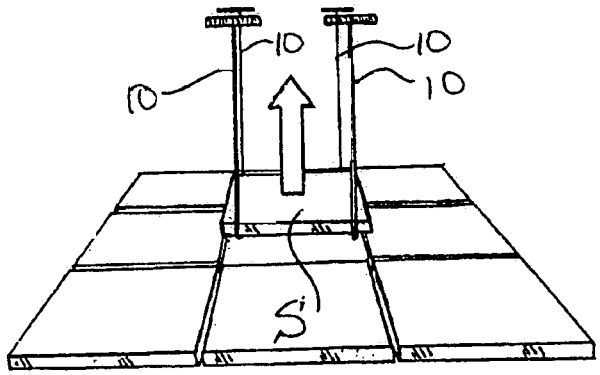

In either embodiment, lifting a pre-cast concrete sidewalk slab S is typically accomplished with two persons P, each provided with a pair of lifting devices 10 held by their respective handles 20 in the respective hands of the person. As illustrated in FIGS. 9A through 9C each person inserts their respective pair of lifting devices within a gap between the slab and an adjacent slab along a respective side edge of the slab to be lifted. The lifting devices 10 are each preferable located adjacent a respective one of the four corners of the slab for maximum stability. The hook members are oriented parallel and adjacent to the edge of the slab to be lifted so that the hooks may be lowered within the gap until positioned below a bottom edge of the slab. Once in this position the hook members may be rotated as illustrated in FIGS. 10A through 10C by rotating the shafts about their respective longitudinal axis as the person twists the respective handles 20 using their hands. Once the hook members are perpendicular to the side edges of the slab and located directly adjacent the bottom side of the slab, the slab is prepared to be lifted as illustrated in FIGS. 11A through 11C. The various stages are summarized in FIGS. 2 and 3 in which the three steps of insertion, rotation and lifting are also shown.

A set of up to four lifting devices are typically provided for use in various modes and combinations to manipulate large heavy items that have a distinct flat bottom surface, particularly items in the outdoor/landscaping area like pre-cast concrete slabs, railway ties, and landscape ties. Each lifting device consists of a thin round rod shaft which is approximately 2 feet in length with a small 87 degree flat hook having an acute interior angle and which is approximately 1 inch in length. The hook is bent at one end and a handle which is approximately 5 inches in length is attached to the shaft in the center of the handle at the other end so as to lie perpendicularly to the hook. An operator of the lifting device would grasp a lifting device by its handle in one hand.

To extract and lift a block/tie, two operators would each use two lifting device, one in each operator's hand. Each operator would lower the hook of each lifting device below the bottom surface of the slab/tie with the hook positioned parallel to the edge of the block/tie surface, twist each lifting device 90 degrees in the direction to position each hook under the block/tie bottom surface, then both operators would lift the block/tie with the lifting device in the "set" position.

To release the block/tie in the exact position and location desired, the operators would reverse the process used to lift a block/tie. The operators would position the block/tie over the position and location desired. The operators would lower the block/tie into the position by lowering the lifting device in their hands. Once the block/tie rests in its final position, each operator twists each of their lifting device 90 degrees to "unset" the hooks by positioning the hooks parallel to the edge of the block/tie surface. The operators then remove each of their lifting devices from the work area by lifting each lifting device.

The lifting devices can be used in various other manners including: 1) using one operator with one or two lifting devices to lift one end of the block/tie for fine adjustments to the elevation of the block/tie with levelling material, for example sand and the like; 2) using the hook to scrape or clear the material between two blocks that was originally used to set the blocks; or 3) using the lifting device as an extension of the operator's hand to reach for items.

A single lifting device apparatus is generally comprised of a shaft, a hook and a handle.

The shaft comprises thin round rod approximately 3/16 inch in diameter with an approximate length of two feet and consisting of a high strength material to provide the required tension strength, torsion strength, and bending resistance to operate the lifting device's lowering, twisting, and lifting of the anticipated weights to be manipulated.

The hook comprises a small length flat hook approximately one inch in length which is bent into one end of the shaft at 90 degrees of the main shaft or an acute interior angle in the order of 87 degrees. The end of the shaft where the hook is created is generally referred to as the bottom end of the shaft.

The handle comprises a length of material to adequately support any operator's entire hand when the operator grasps the handle, for example approximately five inches, and a thickness and shape to provide the operator's hand comfort when twisting the lifting device and lifting potentially heavy weight.

The handle is solidly attached on the opposite end of the shaft to the bottom end where the hook was created. The end where the handle is attached on the shaft is referred to as the top end of the shaft. The handle is attached at its mid-length length point to the top end of the shaft. The handle is attached at 90 degrees of the main shaft and perpendicular to the position of the hook.

The lifting device would typically be held by the handle in an operator's left and/or right hand with the operator's hand positioned on the handle so that the shaft of the lifting device is centered at the center of the operator's hand.

An operator using the lifting device in one or both hands would position the hook of each lifting device below the bottom flat surface of the block/tie to be manipulated and perpendicular to the edge of the surface of the block/tie where the lifting device is positioned beside the block/tie. This operation is referred to as setting the hook. An operator using the lifting device would then lift directly upward and evenly by all used lifting devices on the handles thereof, thereby lifting the block/tie off the ground surface where it rested. This operation is referred to as lifting.

The operators that have completed the operation of lifting can return the raised block/tie back to rest upon the ground surface by having the operators of all lifting devices lower all lifting devices used in the original lifting operation to the point where the block/tie is resting upon the ground surface. This operation is referred to as lowering.

The operators that have completed the operation of lowering would remove the lifting devices used to perform the lowering operation by twisting the handle of each used handle by 90 degrees. The operators would then lift all the used lifting devices in the operation in a straight up manner, thereby removing the lifting device from the work area. This operation is referred to as unsetting the hook.

The operator could use the lifting device as an apparatus to clear any debris or loose material between closely positioned blocks. This loose material between block is commonly levelling/packing sand which needs to be removed in the location, whereby the lifting device needs to be lowered during the operation of setting the hook so that the lifting device's hook could be positioned below the bottom surface of the block.

The operator could use the lifting device as an apparatus to extend the reach of the operator's arm/hand to reach for an item that would normally be out of the operator's reach.

Unique functional components or features of the lifting device may include a very narrow shaft and hook to allow for insertion of the shaft/hook between very narrow spaces between concrete slabs while also providing the critical tension strength to support the heavy weight of the slab, the critical torsion strength to allow the hook to rotate in direct proportion to the amount of rotation that the handle rotates (especially when the shaft is at a length required for a person to stand as he/she uses the apparatus), and bend resistance to allow the 90 degree angle to be maintained when the significant weight of the slab is placed onto the hook as the slab is lifted by the apparatus.

The device is provided with a shaft length that is long enough for a short adult to stand upright (with bent knees) when using the apparatus and still provide all the attributes of the last statement.

The shaft is in a round rod shape to allow for the shaft/hook to be rotated 90 degrees easily without it binding between the narrow crack between the slabs.

The hook at the bottom of the shaft bends a sharp 90 degrees from the shaft to allow the edge of the slab to rest right up into the 90 degree angle where the most strength of the material exists to hold the significant weight of the slab.

The hook is relatively small in length (approximately 1") to allow the compromise of the hook being able to easily rotate 90 degrees as it pushes ground material out of its way under the slab while still providing enough support to the slab for the apparatus during the lift.

The hook is flat surfaced from the point of the 90 degree angle to the tip of the hook so that the entire surface of the hook contacts the bottom surface of the slab, providing more support and less stress to one point on the hook.

The handle provides comfort in the operator's hand when he/she applies the rotation and lifts the heavy weight applied to the hook as the operator lifts with the handle.

The handle is perpendicular in position to the hook to ensure that the downward stress on the shaft from the lifting of the heavy weight placed on the hook during lifting is evenly distributed on either side of the handle.

While some embodiments of the present invention have been described in the foregoing, it is to be understood that other embodiments are possible within the scope of the invention. The invention is to be considered limited solely by the scope of the appended Claims.

The invention claimed is:

1. A method of lifting an object comprising a first sidewalk slab which is positioned adjacent a second sidewalk slab of similar configuration, the object having a substantially flat bottom supported on particulate material on the ground, the method comprising:
   providing at least one lifting device comprising an elongate shaft member, a hook member supported on a first end of the shaft member transversely to a longitudinal direction of the shaft member, and a gripping member supported on the shaft member adjacent a second end thereof;
   positioning the hook member of said at least one lifting device adjacent and parallel to a respective side edge of the object;
   lowering the hook member of said at least one lifting device along the respective side edge below a respective bottom edge of the object by inserting the hook member of said at least one lifting device in a gap defined between the first and second sidewalk slabs;
   rotating the hook member of said at least one lifting device, after insertion into said gap, about a longitudinal axis of the shaft member until the hook member is positioned below the object; and
   lifting said at least one lifting device.

2. The method according to claim 1 including forming the hook member to extend substantially straight along a hook axis lying substantially perpendicular to the longitudinal direction of the shaft member.

3. The method according to claim 1 including providing a plurality of lifting devices and positioning the lifting devices along opposing side edges of the object.

4. The method according to claim 1 including providing a plurality of lifting devices and positioning the lifting devices at spaced positions along at least one side edge of the object.

5. The method according to claim 1 including providing a plurality of lifting devices and positioning two of the lifting devices at spaced positions along two opposing side edges of the object.

6. The method according to claim 1 including forming the hook member to comprise only a hook which is straight along the hook axis.

7. The method according to claim 1 including forming the hook member to be wholly straight along a hook axis lying substantially perpendicular to the longitudinal direction of the shaft member.

8. The method according to claim 1 including forming the hook member to be and wholly extending substantially straight along a hook axis between the shaft member and a tip of the hook member.

9. The method according to claim 1 including integrally forming the shaft member and the hook member of a single rod of material which has been deformed.

10. The method according to claim 1 including forming the shaft member to be circular in cross section at the first end thereof.

11. The method according to claim 1 including forming the shaft member to be approximately two feet in length.

12. The method according to claim 1 including providing the shaft member and the hook member with a similar cross sectional dimension which is substantially less than ½ inch.

13. The method according to claim 1 including forming the gripping member to comprise a handle mounted on the shaft member transversely to the longitudinal direction of the shaft member and the hook axis.

14. The method according to claim 13 including fixing the handle in orientation relative to the shaft member and the hook member.

15. The method according to claim 13 including injection molding the handle about the second end of the shaft member.

16. The method according to claim 15 including deforming the second end of the shaft member prior to injection molding the handle thereabout.

17. A method of lifting an object comprising a first sidewalk slab which is positioned adjacent a second sidewalk slab of similar configuration, the object having a substantially flat bottom supported on particulate material on the ground, the method comprising:

providing at least one lifting device comprising an elongate shaft member, a hook member supported on a first end of the shaft member transversely to a longitudinal direction of the shaft member, and a gripping member supported on the shaft member adjacent a second end thereof;

forming the shaft member and the hook member integrally with one another of a single rod of material which has been deformed, which has a cross sectional dimension which is substantially less than a ½ inch, and which is generally circular in cross section at the first end of the shaft member;

forming the hook member to comprise only a flat-surfaced hook wholly extending substantially straight along a hook axis lying substantially perpendicular to the longitudinal direction of the shaft member between the shaft member and a tip of the hook member;

positioning the hook member of said at least one lifting device adjacent and parallel to a respective side edge of the object;

lowering the hook member of said at least one lifting device along the respective side edge below a respective bottom edge of the object by inserting the hook member of said at least one lifting device in a gap defined between the first and second sidewalk slabs;

rotating the hook member of said at least one lifting device about a longitudinal axis of the shaft member until the hook member is positioned below the object; and lifting said at least one lifting device.

18. A method of lifting an object comprising a first sidewalk slab positioned between adjacent slabs of similar configuration, the object having a substantially flat bottom supported on particulate material on the ground, the method comprising:

providing a plurality of lifting devices, each comprising an elongate shaft member, a hook member supported on a first end of the shaft member transversely to a longitudinal direction of the shaft member, and a gripping member supported on the shaft member adjacent a second end thereof;

positioning two lifting devices at spaced positions along two opposing side edges of the object;

positioning the hook member of each lifting device adjacent and parallel to the respective side edge of the object;

lowering the hook member of each lifting device along the respective side edge below a bottom edge of the object by inserting the hook members in respective gaps defined between the object and the adjacent slabs;

rotating the hook member of each lifting device about a longitudinal axis of the respective shaft member until the hook member is positioned below the object; and lifting the lifting devices to lift the object off of the particulate material.

* * * * *